United States Patent [19]

Ohmae

[11] Patent Number: 5,005,427
[45] Date of Patent: Apr. 9, 1991

[54] KARMAN VORTEX FLOWMETER WITH SIGNAL WAVEFORM SHAPER CIRCUIT

[75] Inventor: Katsuhiko Ohmae, Himeji, Japan

[73] Assignee: Mitsubishi Denki Kabushiki Kaisha, Tokyo, Japan

[21] Appl. No.: 565,084

[22] Filed: Aug. 10, 1990

Related U.S. Application Data

[62] Division of Ser. No. 340,206, Apr. 19, 1989.

[30] Foreign Application Priority Data

Apr. 19, 1988 [JP] Japan ................................. 63-97869

[51] Int. Cl.$^5$ ............................................... G01F 1/32
[52] U.S. Cl. .................................. 73/861.22; 307/358
[58] Field of Search ............ 73/861.18, 861.22, 861.23; 307/354, 356, 358, 359

[56] References Cited

U.S. PATENT DOCUMENTS

| 4,334,426 | 6/1982 | Kita et al. ........................ | 73/861.22 |
| 4,535,294 | 8/1985 | Ericksen et al. .................. | 307/358 |
| 4,634,895 | 1/1987 | Luong ................................ | 307/358 |

*Primary Examiner*—Herbert Goldstein
*Attorney, Agent, or Firm*—Sughrue, Mion, Zinn, Macpeak and Seas

[57] ABSTRACT

A Kármán vortex flowmeter which comprises, in addition to a conventional vortex frequency detector for outputting an electrical signal including a vortex frequency signal component, a filter group consisting of a plurality of filters having a gradation of pass bands covering the variation range of the vortex frequency, and a waveform shaper circuit coupled to the output of the filter group for forming a pulse-shaped signal having a frequency equal to the vortex frequency. A filter in the filter group is selectively coupled to the shaper circuit in response to the output frequency thereof. The shaper circuit, on the other hand, holds the peak and the bottom level of the electrical signal; compares them with the positively and the negatively shifted electrical signal, respectively; and sets and resets a flip-flop when the peak and the bottom level cross with the positively and the negatively shifted electrical signal, respectively, the peak and the bottom level being reset after each occurrence of the crossing. The flip-flops outputs a pulse-shaped signal having the vortex frequency even if the electrical signal contains high and low frequency noise components.

2 Claims, 3 Drawing Sheets

KARMAN VORTEX FLOWMETER WITH SIGNAL WAVEFORM SHAPER CIRCUIT

This is a Division of application Ser. No. 07/340, filed Apr. 19, 1989.

BACKGROUND OF THE INVENTION

1. Field of the Invention

This invention relates to Kármán vortex flowmeters in which fluid flow rate is determined from the frequency at which vortices are formed by a cylindrical obstruction in the flow; more particularly, it relates to such vortex flowmeters having a signal waveform shaper circuit for obtaining a pulse-shaped vortex frequency signal from which the effects of the noise and the beat frequency components superimposed on the vortex frequency are removed.

2. Description of the Prior Art

In the control of internal combustion engines of automobiles, it is essential to measure the amount of air intake accurately and reliably. Among the many types of flowmeters now in use, vortex flowmeters, more particularly Kármán vortex flowmeters, are particularly suited for use in the internal combustion engines of an automobile for measuring the flow rate of the air intake. Since they have no movable mechanical parts, they are robust and are capable of measuring the flow rate accurately and reliably under severe and variable conditions; further, they are capable, in principle, of measuring a wide range of flow rates.

The principle of the Kármán vortex flowmeter is well known: a double row of line vortices, known as the Kármán vortex street, is shed in a flow of a fluid in the wake of a cylindrical obstruction; the vortices, or eddies, are shed periodically first from one side, and then from the other side, of the cylindrical body, wherein the frequency of vortex formation is proportional to the velocity of the fluid flow. Thus, the flow rate of the fluid can be determined from the frequency of vortex formation. The frequency of vortex formation itself may be determined by utilizing sensors such as a thermistor, a strain gauge, or a piezoelectric element; alternatively, it may be determined by utilizing the fact that ultrasonic waves traversing the vortices undergo phase modulation.

A conventional Kármán vortex flowmeter utilizing ultrasonic wave beams for determination of vortex generation frequency us disclosed, for example, in the Japanese Patent Publication No. 58-5641. Referring now to FIG. 1 of the drawings, the vortex flowmeter for use in an internal combustion engine disclosed in the above Japanese patent is described. (FIG. 1 is a block diagram of a vortex flowmeter according to this invention, and not that of a conventional flowmeter; however, since the flowmeter of FIG. 1 according to an embodiment of this invention incorporates as vortex signal detector means 100 the flowmeter disclosed in the above mentioned patent, the conventional vortex flowmeter is described in reference to FIG. 1.)

The conventional vortex flowmeter disclosed in the above Japanese patent may roughly be divided into two portions: the first portion, including an ultrasonic oscillator and an ultrasonic receiver, effects phase modulation of the carrier frequency by means of the vortices generated at a period proportional to the velocity of the air flow; on the other hand, the second portion effects demodulation on the phase-modulated signal outputted from the first portion, i.e. removes the carrier frequency from the output signal of the first portion and restores the modulating signal (i.e. the vortex generation frequency signal).

The above first portion has the following organization. Namely, a shown in FIG. 1, an ultrasonic oscillator 4 and an ultrasonic receiver 5 are disposed to oppose each other across an air flow passage 1 in the downstream side of a cylindrical obstruction body or a vortex generator 2 disposed in the passage 1 at right angles with the direction of the air flow. The ultrasonic oscillator 4 is oscillated by an ultrasonic oscillation circuit 6 in such a way that the ultrasonic wave is propagated across the Kármán vortex street 3 shed in the wake of the vortex generator 2. The ultrasonic wave beam traversing the Kármán vortex street 3 undergoes a phase modulation due to the vortices of the Kármán vortex street 3 which pass periodically across the ultrasonic beam. Since the frequency of vortex formation is proportional to the velocity of the air flow in the passage 1, the ultrasonic wave is phase-modulated with a modulation frequency proportional to the flow rate. The ultrasonic beam thus undergoing phase modulation is received by the ultrasonic receiver 5. Thereafter, the signal received by the receiver 5 undergoes waveform shaping at the waveform shaper circuit 8 to be outputted therefrom to the phase comparator 9.

The above-mentioned second portion, on the other hand, comprises a phase synchronization loop for demodulating the output signal of the waveform shaper circuit 8. The phase synchronization loop consists of the phase comparator 9, the ultrasonic oscillation circuit 6, the voltage-controlled phase shift circuit 7, and the loop filter (i.e. a low-pass filter which passes the direct-current (dc) component but removes the alternating-current (ac) components from the modulated signal) 10. This phase synchronization loop makes the phase of the output signal of the phase shift circuit 7 follow exactly the phase of the carrier signal of the output of the waveform shaper circuit 8 in the following manner: the output of the ultrasonic oscillation circuit 6 oscillating the ultrasonic oscillator 4 is supplied to the voltage-controlled phase shift circuit 7; the phase shift circuit 7 shifts the phase angle of the output of the ultrasonic oscillation circuit 6 in response to the output voltage signal from the loop filter 10, maintaining the high frequency of the ultrasonic oscillation frequency signal, and outputs the resulting signal to the phase comparator 9; the phase comparator 9 compares the phase of the output of the waveform shaper circuit 8 and that of the output of the voltage-controlled phase shift circuit 7, and the result of the comparison, i.e. a signal which consists of a variety of frequency components including a dc term, but the instantaneous magnitude of which is essentially proportional to the difference in phase between the outputs of the phase shift circuit 7 and the waveform shaper circuit 8, is applied to the loop filter 10. The loop filter 10 removes frequency components other than the dc term the magnitude of which is proportional to the difference in phase between the output of the phase shift circuit 7 and the carrier wave of the phase-modulated signal outputted from the waveform shaper circuit 8. The phase shift angle of the phase shift circuit 7 is controlled in accordance with the dc control voltage outputted from the loop filter 10. Thus, the output of the phase shift circuit 7 is kept exactly in phase with the carrier signal of the output of the waveform shaper circuit 8. The output of the phase comparator 9 is also supplied to the low-pass filter 11 which removes the carrier frequency and passes the modulating signal (i.e. the vortex frequency signal which primarily consists of the frequency component corresponding to the vortex generation frequency). Thus, the low-pass filter 11 outputs a demodulated (sinusoidally varying) vortex generation frequency signal.

The above described vortex flowmeter, however, has the following disadvantage. Namely, in spite of the provision of the waveform shaper circuit 8 and the low-pass filter 11, the output signal of the flowmeter (i.e. the output of the low-pass filter 11) comprises noises, i.e. frequency components other than the vortex generation frequency. These noises include high frequency noises which are predominant under low flow rate conditions, and low frequency noises, called beats, which are predominant under high flow rate conditions. Further, there is a particular type of low frequency noise due to the pulsation of the air flow caused by certain operative conditions of the engine. These noises may become so conspicuous as to disturb the accurate determination of the vortex generation frequency. Since the noises include both high and low frequency components as described above, simple provision of a low-pass or a high-pass filter which effectively suppresses high or low frequency components does not bring about any appreciable improvement.

The above disadvantage is shared by the types of vortex flowmeters other than those utilizing an ultrasonic beam for vortex frequency detection. Thus, Japanese Utility Model Publication No. 59-18332, for example, proposes, in the case of the type of vortex flowmeter utilizing a piezoelectric element for detecting the vortex frequency, a provision of a low-pass filter wherein the filtering function is halted when the vortex frequency exceeds a predetermined level. On the other hand, Japanese Patent Publication No. 58-15045 proposes, in the case of a flowmeter utilizing an ultrasonic beam for detecting the vortex frequency, the provision of a filter of variable pass band which is controlled in response to the information indicating the operative conditions of the engine.

Although the measures proposed by the above Japanese utility model and patent publications may bring some improvement over the more conventional vortex flowmeters, there still remains much to be hoped for with respect to the effective removal of noises and the accurate and reliable restoration of the vortex frequency signal.

The last-names Japanese patent publication further proposes a provision of a Schmitt trigger circuit for converting the vortex frequency signal into a pulse-shaped electric signal, wherein the trigger level or the amount of hysteresis of the Schmitt trigger is altered in response to the information indicating the operative conditions of the engine. This measure may bring about an improvement over conventional waveform shaper circuits, but it is not enough to provide a circuit which is capable of obtaining a pulse-shaped signal having a frequency that infallibly corresponds to the vortex generation frequency.

SUMMARY OF THE INVENTION

It is the primary object of this invention therefore to provide a vortex flowmeter which is capable of obtaining a pulse-shaped signal having a frequency that infallibly corresponds to the frequency of the vortex generation frequency component contained in an electrical signal that includes, in addition to the vortex generation frequency component, noise components.

It is an additional object of this invention to provide such a flowmeter which is simple in organization and yet is reliable in operation.

It often happens, besides the case of vortex flowmeters, that the information obtained by a measurement, for example, is born by the frequency of an essentially sinusoidal signal component containing an electrical signal that includes noise components. In such circumstances, the same circuit organization which accomplishes the above objects can be used to obtain a pulse-shaped signal having a frequency that corresponds to the frequency of the sinusoidal signal component contained in the electrical signal.

It is an additional object of a further aspect of this invention therefore to provide a circuit for obtaining a pulse-shaped signal having a frequency that infallibly corresponds to the frequency of the information-bearing signal component contained in an electrical signal that includes noise components.

The above objects are accomplished in accordance with the principles of this invention in a vortex flowmeter comprising, in addition to a conventional vortex generation frequency detector means for outputting an electrical signal including an information-bearing frequency signal component, the following circuit elements: a filter group including a plurality of filters having a gradation of pass bands which covers the whole range of the variation of the signal frequency component, i.e. the vortex generation frequency component; a waveform shaper circuit, coupled to the output of the filter group, for forming a pulse-shaped signal having a frequency corresponding to the frequency of the vortex generation frequency; a change-over switching circuit, inserted between the output of the filter group and the input of the waveform shaper circuit, for selectively coupling one of the filters of the filter group to the input of said waveform shaper circuit; and a filter change-over determination circuit, coupled to the output of the waveform shaper circuit, for controlling said change-over switching circuit in response to the pulse-shaped outputted from the waveform shaper circuit, in such a manner that a filter in the filter group having a frequency band corresponding to the frequency of the pulse-shaped signal is coupled to the input of said waveform shaper circuit through the change-over switching circuit.

According to the above organization, the filter in the filter group is selected by the output frequency of the waveform shaper circuit which corresponds to the signals frequency component. Namely, the changing over of the pass band of the filter group is controlled by the feedback control method in accordance with the frequency of the pulse-shaped output signal. Thus, the optimum pass band, which passes the signal frequency but effectively attenuates and removes the high and low frequency noise components, can always be selected in the gradation of bands comprised in the filter group.

It is apparent that the characteristic portion of the above circuit organization can be used to obtain a pulse-shaped signal having a frequency corresponding to the information-bearing signal frequency component contained in an electrical signal that includes noise components.

According to a further aspect of this invention, the waveform shaper circuit, which may be incorporated in the above organization of the flowmeter or may be used with any other device which outputs an electrical signal including an information-bearing sinusoidal frequency signal component, comprises the following elements: a peak level holding circuit for holding the highest level of the electrical signal which occurs after it is set into a holding operation; a bottom level holding circuit for holding the lowest level of the electrical signal which occurs after it is set into a holding operation; a positive level shift circuit for shifting the level of the electrical signal by a predetermined positive amount; a negative level shift circuit for shifting the level of the electrical signal by a predetermined negative amount; a first comparator for outputting a pulse when the level of the positively shifted signal falls under the level held by the peak level holding circuit; a second comparator for outputting a pulse when the level of the negatively shifted signal rises above the level held by the bottom level holding circuit; a flip-flop circuit (i.e. a bistable multivibrator circuit) for outputting a pulse-shaped signal which goes to a first (e.g. the high) level in response to a pulse outputted from the first comparator, and to a second (e.g. the low) level in response to a pulse outputted from the second comparator; a peak level resetting circuit for resetting the level held by the peak level holding circuit each time after the level of the positively shifted signal falls under the level held by the peak level holding circuit; and a bottom level resetting circuit for resetting the level held by the bottom level holding circuit each time after the level of the negatively shifted signal rises above the level held by the bottom level holding circuit.

According to the above organization of the waveform shaper circuit, the peak and the bottom level held by the peak and the bottom level holding circuit are compared with the positively and the negatively shifted signal, respectively; the flip-flop is set to the first level when the positively shifted signal falls under the peak level; it is reset to the second level when the negatively shifted signal rises above the bottom level. Thus, even if the electrical signal contains high and low frequency noises, the flip-flop is infallibly set after an occurrence of a peak level of the signal frequency component; it is infallibly reset after an occurrence of a bottom level thereof.

According to a preferred embodiment of this invention, the peak and the bottom level resetting circuit of the waveform shaper circuit resets the peak and the bottom level as follows. In response to the transition of the output of the flip-flop from the second to the first level, the peak level holding circuit is set into a holding operation, while the output of the bottom level holding circuit is returned to a predetermined high voltage level (i.e. the source voltage level); in response to the transition of the output of the flip-flop from the first to the second level, on the other hand, the output of the peak level holding circuit is returned to the ground level, while the bottom level holding circuit is set into a holding operation.

BRIEF DESCRIPTION OF THE DRAWINGS

The novel features which are believed to be characteristic of this invention are set forth with particularity in the appended claims. This invention itself, however, both as to its organization and method of operation, together with further objects and advantages thereof, may best be understood by reference to the following detailed description of the preferred embodiment, taken in conjunction with the accompanying drawings, in which:

In the drawings, like reference numerals and characters represent like or corresponding portions or signals.

DETAILED DESCRIPTION OF THE PREFERRED EMBODIMENTS

Figure 1:
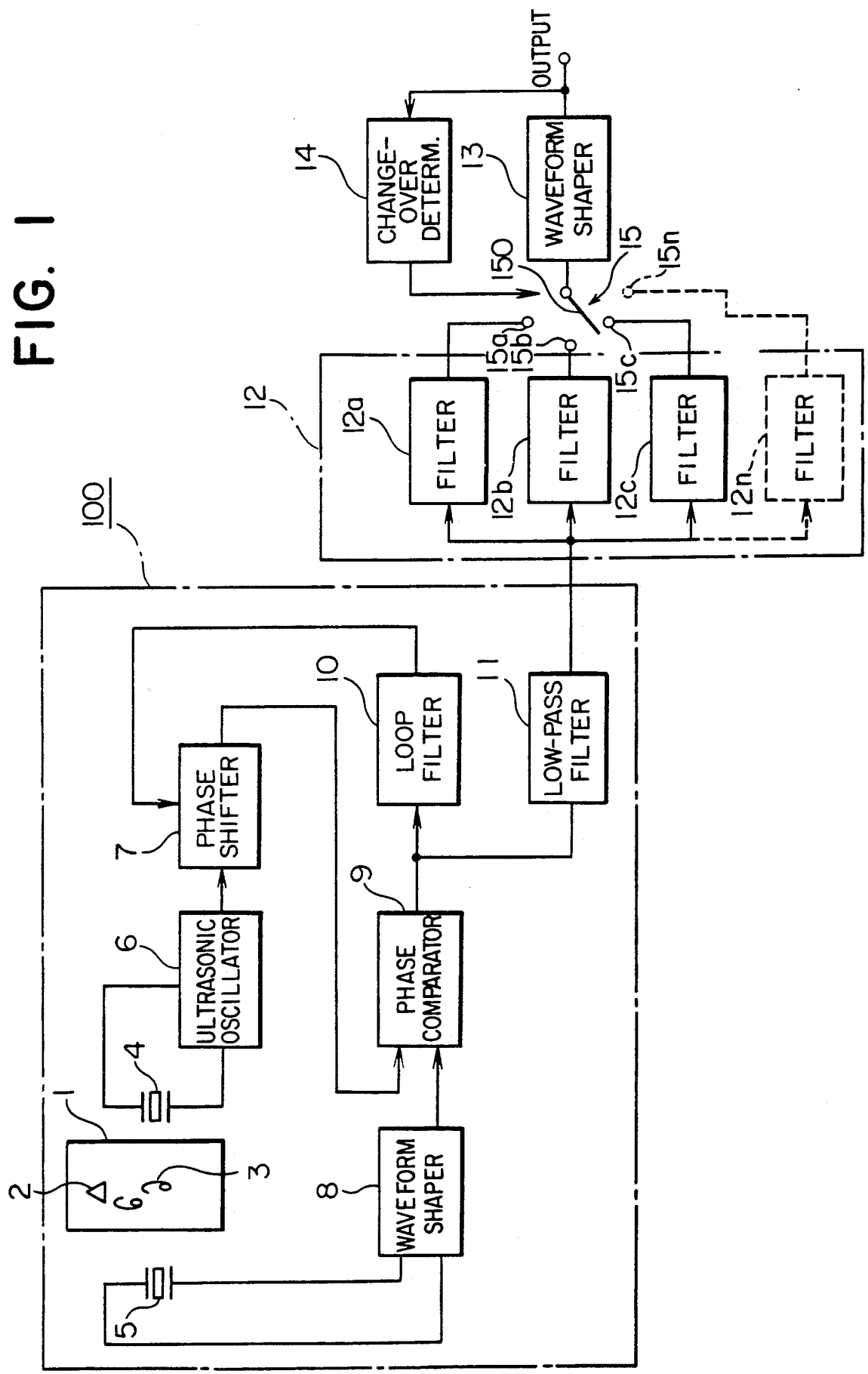
FIG. 1 is a block diagram showing the overall organization of an embodiment of a vortex flowmeter according to the principles of this invention.
Figure 2:
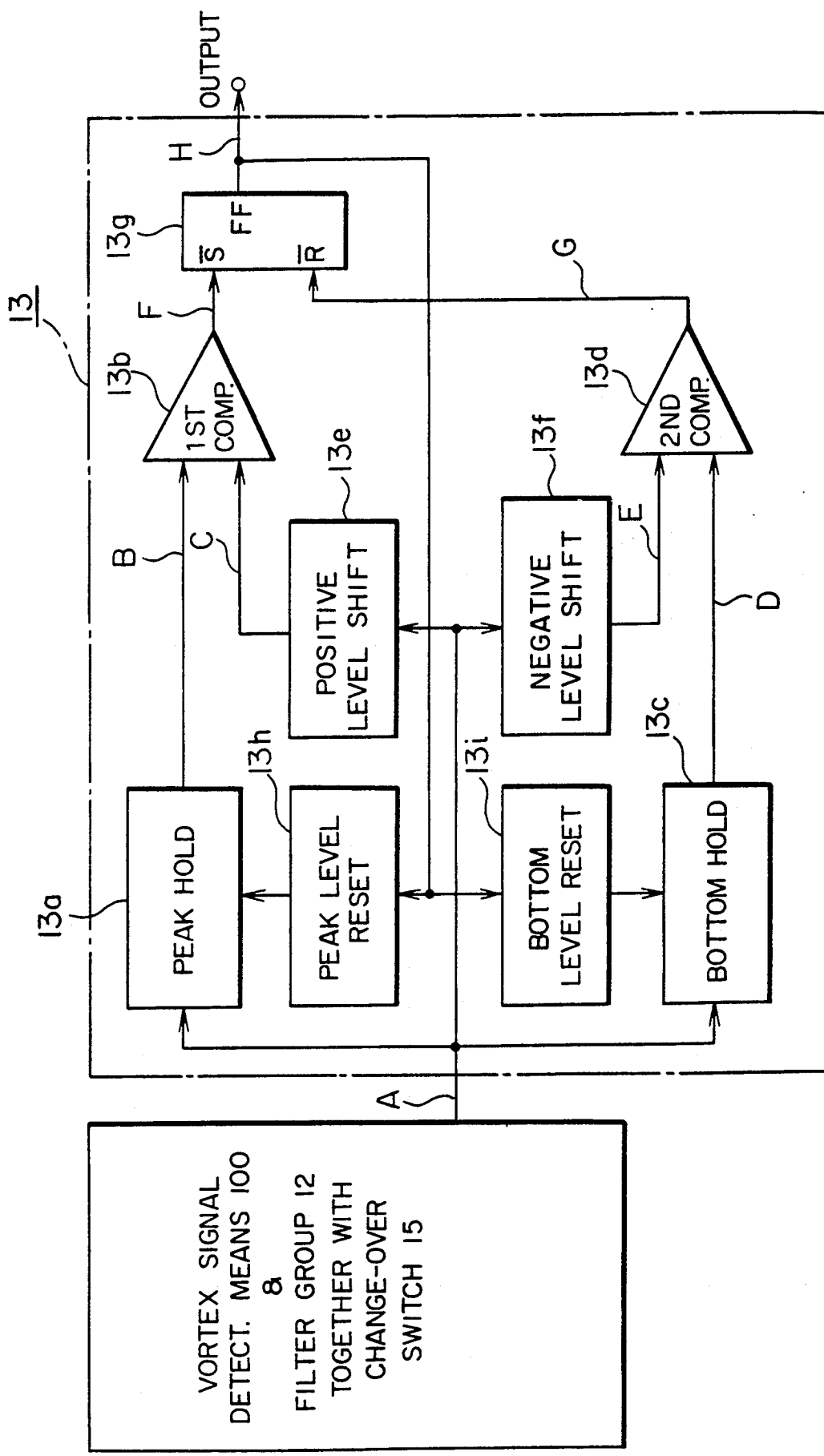
FIG. 2 is a block diagram showing the detailed organization of the waveform shaper circuit of the flowmeter of FIG. 1 according to the principles of this invention.
Figure 3:
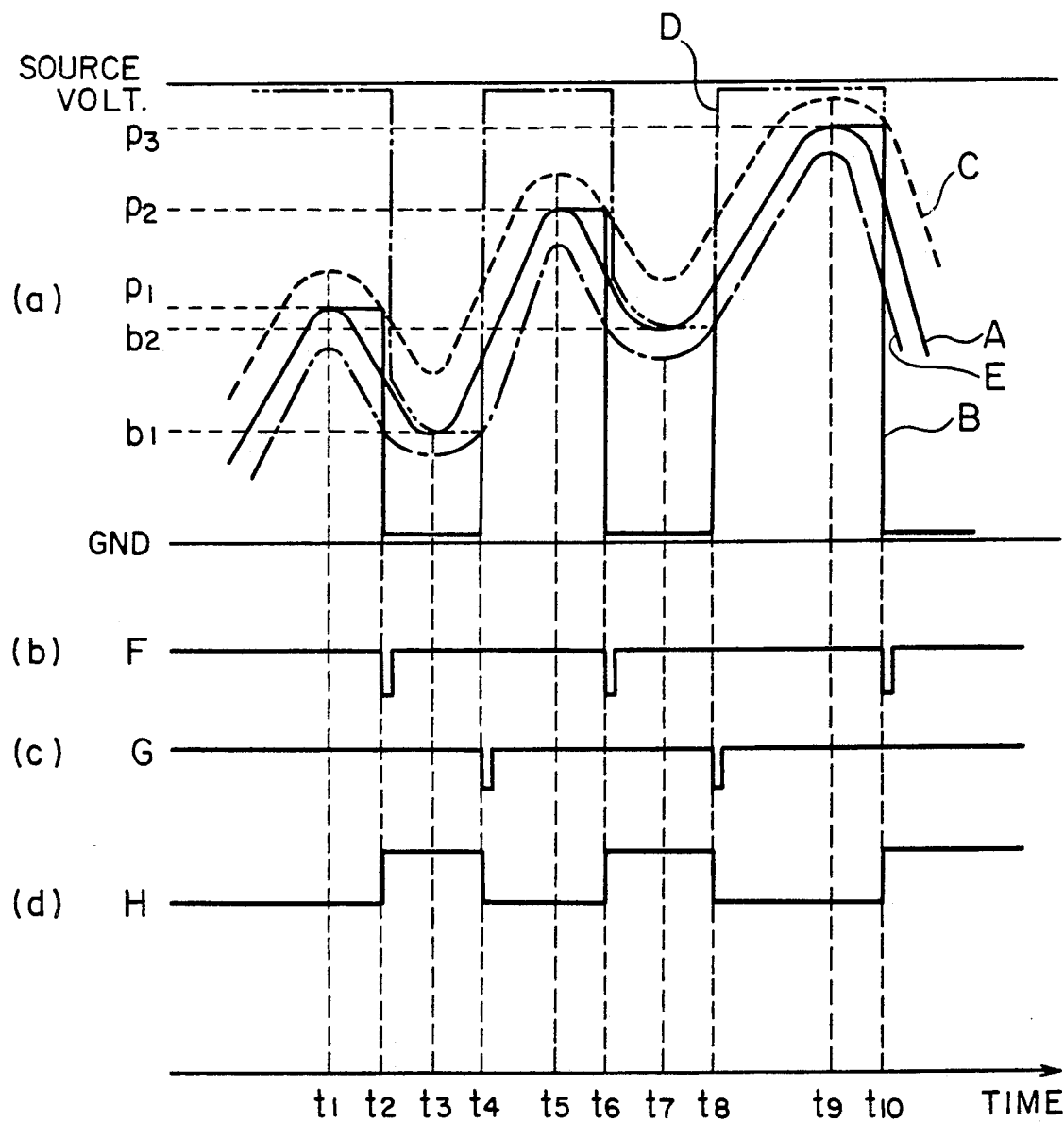
FIG. 3 is a graphic representation of waveforms certain signals occurring in the waveform shaper circuit of FIG. 2.

Referring now to FIGS. 1 through 3 of the drawings, an embodiment according to this invention is described.

FIG. 1 shows the overall organization of a vortex flowmeter for measuring the amount of air intake into an internal combustion engine of an automobile. In the figure, the vortex signal detector means 100 is identical to the conventional vortex flowmeter described above; thus, the description thereof is not repeated here. It is noted, however, in connection with the vortex signal detector means 100, that is may be replaced by any conventional vortex flowmeter which detects, either by means of an ultrasonic wave phase modulation or by means of sensors such as piezoelectric element or thermistor, the vortex generation frequency of the Kármán vortex street 3 formed by a cylindrical obstruction body 2 positioned in the flow of the fluid, and which outputs an essentially sinusoidally varying electrical signal having a frequency component corresponding to the vortex generation frequency. By the way, the electrical signal which includes, as the information-bearing portion, a frequency component corresponding to the vortex generation frequency, may be referred to as vortex frequency signal or simply as vortex signal hereinafter.

On the other hand, the portion of the flowmeter of FIG. 1 which is characteristic of this invention includes the following: a filter group 12 consisting of a plurality of filters 12a through 12n having different pass bands forming a gradation of the frequency range in which the vortex generation frequency may vary; a waveform shaper circuit 13, coupled to the output of the filter group 12 through a change-over switching circuit 15, for shaping the output of the filter group 12 into a pulse-shaped vortex frequency signal having the same frequency as the vortex generation frequency; a filter change-over determination circuit 14 for determining the position of the change-over switching circuit 15 in response to the output of the waveform shaper circuit 13; and a change-over switching circuit 15 including a movable contact member 150 and a plurality of fixed contact points 15a through 15n coupled to the output terminals of the gradated filters 12a through 12n of the filter group 12, respectively.

The operation of the elements 12 through 15 characteristic of this invention is as follows:

The output of one of the filters 12a through 12n of the filter group 12 is coupled to the waveform shaper circuit 13, through one of the fixed contact points 15a through 15n associated therewith, by means of the movable contact member 150 of the switching circuit 15. (The selection of one of the filters in the filter group 12 is effected by the filter change-over circuit 14 as described below.) Thus, a vortex frequency signal passing through the selected one of the filters 12a through 12n is supplied to the waveform shaper circuit 13. The waveform shaper circuit 13 converts this essentially sinusoidally varying vortex frequency signal into a pulse-shaped signal having a frequency exactly signal to the vortex generation frequency. In response to this pulse-shaped vortex frequency signal outputted from the waveform shaper circuit 13, the filter change-over determination circuit 14 determines the position of the movable contact member 15 to connect the output of one of the filters 12a through 12n to the waveform shaper circuit 13. Namely, the change-over determination circuit 14 determines the frequency of the output pulses of the waveform shaper circuit 13 by counting the number of pulses outputted in a predetermined length of time; in accordance with the determined frequency, the change-over determination circuit 14 selects a filter in the filter group 12 which has a pass band corresponding to the frequency of the pulse-shaped output signal of the waveform shaper circuit 13. Since the pass bands of the filters 12a through 12n are gradated over the whole frequency range of the vortex generation, the selected one of the filters 12a through 12n effectively attenuates frequency components other than the vortex generation frequency, i.e. noise components, while passing the vortex frequency component.

As described above, the selection of a filter in the filter group 12 is effected by means of a feedback loop consisting of the change-over determination circuit 14. This characteristic feature of this invention is highly effective in selecting the most appropriate filter in the filter group 12 and in effectively reducing the noise components. The reason therefor may be explained as follows:

In the low flow rate measurement region of the air intake into the internal combustion engine, such as during the idling period thereof, the output of the vortex signal detector means 100 includes only negligibly small noise components. Namely, during the idling period of the internal combustion engine, the degree of opening of the throttle valve is extremely small; the flow of air, after passing through the passage 1 in which the flow rate is measured by the flowmeter according to this invention, is restricted by the throttle valve before it is supplied to the engine. Thus, pulsations of the air flow caused by a certain operative condition of the engine and ultrasonic noises occurring in the downstream side of the throttle valve are prevented from propagating to the upstream side of the throttle. As a result, the vortex signal detector means 100 outputs a stable vortex frequency signal which does not include an appreciable amount of noise components. Thus, the output frequency of the waveform shaper circuit 13 exactly corresponds to the vortex generation frequency of the Kármán vortex street 3, and the selection of the filter having a pass band corresponding to the vortex generation frequency is effected accurately by the filter change-over determination circuit.

When, on the other hand, the revolutions per minute of the engine increases to raise the vortex generation frequency of the Kármán vortex street 3, the most appropriate filter in the filter group 12, i.e. the filter having a pass band corresponding to the vortex generation frequency, is selected by the change-over determination circuit 14 in response to the output frequency of the waveform shaper circuit 13. Thus, the high and low frequency noise components which may be included in the output of the vortex signal detector means 100 (i.e. in the output of the low pass filter 11 in the case of the device of FIG. 1) are effectively removed by the selected filter in the filter group 12. In the above described manner, the noise components other than the vortex generation frequency are effectively removed by the filter group 12, the changing-over of which is controlled by the filter change-over determination circuit 14 in accordance with the output frequency of the pulse-shaped signal of the waveform shaper circuit 13.

Although the selection of a filter in the filter group 12 by the feedback control method according to this invention is effective in suppressing the noise components, the vortex frequency signal passing through the filter group 12 may still contain high and low frequency noise components. However, the waveform shaper circuit 13 is capable, even if noises are present, of forming a pulse-shaped signal having a frequency corresponding to the vortex generation frequency, as will become clear from the following description thereof.

Referring now to FIG. 2 of the drawings, the detailed organization of the wave form shaper circuit 13 which accurately converts the essentially sinusoidal vortex frequency signal into a pulse-shaped frequency signal is described. Waveform shaper circuit 13 comprises, in addition to a flip-flop circuit 13g for outputting the pulse-shaped vortex frequency signal H, two portions: the first portion (shown in the upper half in the figure) consists of circuits 13a, 13b, 13J, and 13h, and sets the RS flip-flop 13g to raise the output signal H to a high level (with a certain delay time, as will become clear below), when a peak level of the sinusoidal frequency signal A, supplied from the vortex signal detector means 100 through the filter group 12, is detected; the second portion (shown in the lower half in the figure) consists of circuits 13c, 13d, 13f, and 13I, and resets the flip-flop 13g to reduce the output signal H to the low (i.e. ground) level (with a certain time delay), when a bottom level of the sinusoidal frequency signal A is detected.

The first portion, i.e. the portion which sets the flip-flop 13g, comprises: a peak level holding circuit 13a, coupled to filter group 13 through switching circuit 15 for holding each peak level of the signal A and for outputting a peak level signal B; a positive level shift circuit 13e, coupled to filter group 12 through switching circuit 15, for shifting the level of the signal A positively by a predetermined magnitude, i.e. for outputting a signal C which has the same waveform as the signal A but the level of which is higher than that of the signal A by a predetermined amount; a first comparator circuit 13b, coupled to the outputs of the peak level holding circuit 13a and the positive level shift circuit 13e, for comparing the output signals B and C of the circuits 13a and 13e and for outputting a negative pulse signal F to set the flip-flop 13g when the level of signal B becomes greater than that of the signal C; and a peak level resetting circuit 13h, coupled to the output of the flip-flop 13g, for resetting the peak level held in the peak level holding circuit 13a in response to the output signal H of the flip-flop 13g.

The second portion, i.e. the portion which resets the flip-flop 13g, has an organization similar to that of the first portion. Namely it comprises: a bottom level holding circuit 13c, coupled to filter group 12 through switching circuit 15 for holding each bottom level of the signal A and for outputting a bottom level signal D;

a negative level shift circuit 13f, coupled to filter group 12 through switching circuit 15, for shifting the level of the signal A negatively by a predetermined magnitude, i.e. for outputting a signal E which has the same waveform as the signal A but the level of which is lower than that of the signal A by a predetermined amount; a second comparator circuit 13d, coupled to the outputs of the bottom level holding circuit 13c and the negative level shift circuit 13f, for comparing the output signals D and E of the circuits 13c and 13f and for outputting a negative pulse signal G to reset the flip-flop 13g when the level of signal D becomes smaller than that of the signal E; and a bottom level resetting circuit 13i, coupled to the output of the flip-flop 13g, for resetting the bottom level held in the bottom level holding circuit 13c in response to the output signal H of the flip-flop 13g.

The RS flip-flop 13g is set when pulsed by the output signal F of comparator 13b at input S, to raise the output H thereof to the high level; it is reset when pulsed by the output signal G of the comparator 13d at the input R, to lower the output H to the ground level.

The operation of the circuit 13 of FIG. 2 will now be described. As shown in a solid curve A in the top row (a) in FIG. 3, the vortex frequency signal A outputted from the filter group 12 has an essentially sinusoidally varying waveform, the main frequency component of which corresponds to the vortex generation frequency of the Kármán vortex street 3; the signal A may comprise, however, high and low frequency noise components superimposed on the vortex generation frequency signal. (FIG. 3 shows the waveform A with a low frequency noise component: due to the presence of low frequency noise components, the average level of the waveform A increases during the time interval shown in the figure; it may decrease in other time intervals.) In the following, the fundamental method of operation of the circuit 13 is described first; the effect of high and low frequency noises on the operation is treated thereafter.

In the first or peak level side, the positive level shift circuit 13e outputs the positively shifted signal C as shown by dotted curve C in the same row (a) in FIG. 3. The peak level holding circuit 13a, after being set (e.g. at time points t4, and t8 in the figure) to operate by a resetting circuit 13h, holds the highest level of the signal A until the output of which is reduced to the ground level by the resetting circuit 13h (e.g. at time points t2, t6, and t10 in the figure), as shown in a solid curve B.

To explain this in greater detail, before the time point t1 at which the level of the signal A takes a first peak in the figure, the level of the signal B follows that of the signal A; thereafter, the level of the signal B remains at the preceeding peak level p1 of signal A until time point t2 at which the level of signal B, i.e. the peak level p1, becomes greater than the level of the positively shifted signal C. At this time point t2, the comparator 13b outputs a negative pulse as shown by the waveform F in the second row (b) in FIG. 3, since the level of signal B exceeds that of signal C. In response to this pulse outputted from the comparator 13b, flip-flop 13g is set and the level of the output H thereof rises to the high level. At the same time point t2, in response to the transition of the output of flip-flop 13g from the ground to the high level, the peak level resetting circuit 13h resets the peak level holding circuit 13a and reduces the level of the output signal B thereof to the ground level.

In the second or bottom level side, on the other hand, the negative level shift circuit 13f outputs the negatively shifted signal E as shown by an alternating short and long dash curve E in row (a) of FIG. 3. At time point t2, the bottom resetting circuit 13i sets the bottom level holding circuit 13c into operation, in response to the transition of the output of flip-flop 13g from the ground to the high level. Thus, the output D of the bottom level holding circuit 13c, shown by an alternating two short and one long dash curve D in the top row (a) of FIG. 3, which has been at the high (or source) voltage level before the time point t2, begins to follow the level of the signal A and keeps on decreasing until time point t3 at which a bottom level b1 of signal A is attained. After the time point t3, the level of signal D remains at the bottom level b1 of signal A until it becomes smaller than the negatively shifted signal E. Namely, at time point t4 at which the level of signal D becomes smaller than the level of negatively shifted signal E, the comparator 13d outputs a pulse as shown by the waveform G in the third row (c) in FIG. 3. Thus, in response to the pulse outputted from the comparator 13d, the flip-flop 13g is reset and the level of the output H thereof falls to the ground level, as shown in the bottom row (d) of the same figure. In response to this transition of the output H of the flip-flop 13g from the high to the low level, the bottom level resetting circuit 13i resets the bottom level holding circuit 13c to raise the output D thereof to the source voltage level. At the same time point t4, in response to this transition of the output H of the flip-flop 13g from the high to the low level, the peak level resetting circuit 13h sets the peak level holding circuit 13a to operate again, so that the output B thereof may follow the level of signal A until time point t5 at which the signal A reaches a second peak level p2 in the figure.

After the time point t5 to the time point t9, i.e. between the second and the third peak level p2 and p3 of signal A in the figure, fundamentally the same operation as that during the interval between the first and second peaks p1 and p2 as described above is repeated: at time point t6 at which the level of peak level signal B crosses with that of positively shifted signal C, the flip-flop 13g is pulsed by the output F of the comparator 13b so that the output H rises to the high level; thereafter, at time point t8 at which the level of the bottom level signal D crosses with that of the negatively shifted signal E, the flip-flop 13g is pulsed by the output G of comparator 13d so that the output H falls to the ground level. By repeating the above operation, the flip-flop 13g is set after each occurrence of a peak of the vortex frequency component of signal A and is reset after each occurrence of a bottom thereof; thus, the flip-flop 13g outputs a pulse-shaped signal H which has the same frequency as the vortex generation in the Kármán vortex street 3.

The organization and the method of operation of the waveform shaper circuit 13 as described above is capable of eliminating the adverse effects of high and low frequency noises which are contained in the signal A; this elimination of adverse effects of high and low frequency noises is accomplished in the following manner.

How the waveform shaper circuit 13 can form a pulse-shaped output signal H which has a frequency exactly corresponding to the vortex generation frequency in the case where the signal A contains low frequency noise components is apparent from FIG. 3, in which the successive peak levels p1, p2, and p3 and the successive bottom levels b1 and b2 of the waveform A gradually increase due to the presence of low frequency noise components: although the absolute values of the peak or bottom levels increases during the time period shown in the figure, the flip-flop 13g is infallibly set after a peak level of the vortex frequency component in the signal A occurs; likewise, it is infallibly reset after a bottom level of the vortex frequency component in the signal A occurs. To take the example of an occurrence of a peak level p1 at time point t1, the flip-flop 13g is set when the peak level p1 exceeds the level of the positively shifted signal C at time point t2; thus, provided that the next bottom level of the positively shifted signal C (which occurs at time point t3 in the figure) falls below the preceding peak level p1, the flip-flop 13g is correctly set by an output pulse of the comparator 13b before the time point t3 at which the next bottom level b1 of the signal A is reached. Similarly, the flip-flop 13g is correctly reset, before the next peak level of signal A is attained, by an output pulse of the comparator 13d after an occurrence of a bottom level of the signal A, provided that the next peak level of the negatively shifted signal E rises above the bottom level of the signal A. Thus, the flip-flop 13g is set if and only if a peak level of the vortex frequency component of the signal A occurs; it is reset if and only if a bottom level of the vortex frequency component of the signal A occurs. Hence, the frequency of the pulse-shaped signal H outputted from the flip-flop 13g is exactly equal to the frequency of the vortex generation frequency component of the signal A, even if signal A contains low frequency noise components.

Next, the reason why the waveform shaper circuit 13 is immune to the presence of high frequency noise components in the signal A is explained in the following.

When high frequency noise components are present in the signal A, the waveform thereof includes small fluctuations (not shown in FIG. 3) superimposed on the undulating curve A shown in FIG. 3; thus, the waveform A may have minor peaks (other than the peaks p1, p2, and p3 corresponding to the peaks of vortex generation frequency component of signal A) and minor bottoms (other than the bottom levels b1 and b2 corresponding to the bottoms of the vortex generation frequency component of signal A) occurring at short intervals. The output B of the peak level holding circuit 13a, however, after being set by the circuit 13h, keeps on holding the highest level of the signal A until the level held by the peak level holding circuit 13a crosses with the level of the positively shifted signal C, at which time the holding circuit 13a, is reset by the circuit 13h. For example, in the interval between time points t4 and t6, after being set by the circuit 13h at time point t4, the peak level holding circuit 13a keeps on holding the highest level of signal A that occurs after the time point t4, until the level of the output B thereof crosses with that of the positively shifted signal C; the level of the peak level signal B, however, crosses with that of positively shifted signal C only after a real peak (i.e. a peak of the vortex frequency component) of signal A occurs near the time point t5, provided that the amplitude of the fluctuation due to the high frequency noise components of signal A is smaller than the amount of positive shift (which is equal to the difference in level: C−A between the curves C and A in the figure) effected by the positive level shift circuit 13e. Thus, by selecting the amount of shift at a magnitude which is greater than the greatest amplitude of high frequency noise fluctuation which may be contained in the signal A, the flip-flop 13g is correctly set only after a peak level of the vortex frequency component of the signal A occurs. Similarly, provided that the amount of negative shift: A−E effected by the negative level shift circuit 13f is greater than the amplitude of high frequency noise components contained in signal A, the flip-flop 13g is correctly reset only after an occurrence of a bottom level of the vortex frequency component of the signal A. Hence, even if the signal A contains high frequency noise components, the flip-flop 13g can produce a pulse-shaped signal H having the same frequency as the vortex generation frequency component contained in signal A.

Thus, the waveform shaper circuit 13 according to this invention is capable of outputting a pulse-shaped frequency signal H which has the same frequency as the vortex generation frequency component of signal A, even if the signal A includes high and low frequency noise components.

While description has been made of the particular embodiment of this invention, it will be understood that many modifications may be made without departing from the spirit thereof. For example, the vortex signal detector means 100 may be replaced by any vortex flowmeter which detects the vortex generation frequency and outputs an electrical signal including a frequency component corresponding to the vortex generation frequency. Further, the circuit organization characteristic of this invention can be used to obtain a pulse-shaped signal having a frequency equal to that of the information-bearing signal frequency component of an electrical signal which contains, in addition to the signal frequency component, high and low frequency noise components. Thus, the appended claims are contemplated to cover any such modifications as fall within the true spirit and scope of this invention.

What is claimed is:

1. A vortex flowmeter for measuring an amount of a flow of a fluid, comprising:

vortex generation frequency detector means for detecting a frequency of vortex generation in the flow of the fluid by an obstruction positioned in the flow, said vortex generation frequency detector means outputting an electrical signal including an essentially sinusoidal signal component having a frequency corresponding to the frequency of vortex generation;

peak level holding circuit means, coupled to an output of said vortex generation frequency detector means, for holding a highest level of said electrical signal which occurs after said peak level holding circuit means is set into a holding operation;

bottom level holding circuit means, coupled to the output of said vortex generation frequency detector means, for holding a lowest level of said electrical signal which occurs after said bottom level holding circuit means is set into a holding operation;

positive level shift circuit means, coupled to an output of said vortex generation frequency detector means, for shifting a level of said electrical signal by a positive predetermined amount, and outputting the positively shifted signal therefrom;

negative level shift circuit means, coupled to an output of said vortex generation frequency detector means, for shifting a level of said electrical signal by a negative predetermined amount, and outputting the negatively shifted signal therefrom;

first comparator means, coupled to outputs of said peak level holding circuit means and said positive level shift circuit means, for outputting a pulse when a level held by said peak level holding circuit means crosses with a level of the positively shifted signal outputted from said positive level shift circuit;

second comparator means, coupled to outputs of said bottom level holding circuit means and said negative level shift circuit means, for outputting a pulse when a level held by said bottom level holding circuit means crosses with a level of the negatively shifted signal outputted from said negative level shift circuit;

bistable multivibrator circuit means, having a pair of inputs coupled to outputs of said first and second comparator means, respectively, for outputting a pulse-shaped signal taking a first and a second level, wherein the pulse-shaped signal outputted from said bistable multivibrator circuit means goes to a first level in response to a pulse outputted from said first comparator means, and to a second level in response to a pulse outputted from said second comparator means;

peak level resetting means, coupled to an output of said bistable multivibrator means, for resetting a level held by said peak level holding circuit means each time after the level held by said peak level holding circuit means crosses with the level of the positively shifted signal outputted from the positive shift circuit; and bottom level resetting means, coupled to an output of said bistable multivibrator means, for resetting a level held by said bottom level holding circuit means each time after the level held by said bottom level holding circuit means crosses with the level of the negatively shifted signal outputted from the negative shift circuit.

2. A circuit for outputting a pulse-shaped signal having a frequency corresponding to a frequency of an essentially sinusoidal signal component contained in an electrical signal, comprising:

peak level holding circuit means for holding a highest level of said electrical signal which occurs after said peak level holding circuit means is set into a holding operation;

bottom level holding circuit means for holding a lowest level of said electrical signal which occurs after said bottom level holding circuit means is set into a holding operation;

positive level shift circuit means, coupled to said electrical signal, for shifting a level of said electrical signal by a predetermined positive amount, and outputting the positively shifted signal therefrom;

negative level shift circuit means, coupled to said electrical signal, for shifting a level of said electrical signal by a predetermined negative amount, and outputting the negatively shifted signal therefrom;

first comparator means, coupled to outputs of said peak level holding circuit means and said positive level shift circuit means, for outputting a pulse when a level held by said peak level holding circuit means crosses with a level of the positively shifted signal outputted from said positive level shift circuit;

second comparator means, coupled to outputs of said bottom level holding circuit means and said negative level shift circuit means, for outputting a pulse when a level held by said bottom level holding circuit means crosses with a level of the negatively shifted signal outputted from said negative level shift circuit;

bistable multivibrator circuit means, having a pair of inputs coupled to outputs of said first and second comparator means, respectively, for outputting a pulse-shaped signal taking a first and a second level, wherein the pulse-shaped signal outputted from said bistable multivibrator circuit means goes to a first level in response to a pulse outputted from said first comparator means, and to a second level in response to a pulse outputted from said second comparator means;

peak level resetting means, coupled to an output of said bistable multivibrator means, for resetting a level held by said peak level holding circuit means each time after the level held by said peak level holding circuit means crosses with the level of the positively shifted signal outputted from the positive shift circuit; and bottom level resetting means, coupled to an output of said bistable multivibrator means, for resetting a level held by said bottom level holding circuit means each time after the level held by said bottom level holding circuit means crosses with the level of the negatively shifted signal outputted from the negative shift circuit.

* * * * *